United States Patent
Kim et al.

(10) Patent No.: US 11,236,116 B2
(45) Date of Patent: *Feb. 1, 2022

(54) SILICON COMPOUND

(71) Applicants: SK Innovation Co., Ltd., Seoul (KR); SK-Materials Co., Ltd., Yeongju-si (KR)

(72) Inventors: Cheol Woo Kim, Daejeon (KR); Min Kyung Seon, Daejeon (KR); Yu Na Shim, Daejeon (KR); Jae Hoon Kwak, Yeongju-si (KR); Young Bom Kim, Yeongju-si (KR); Jong Ho Lee, Yeongju-si (KR); Jin Kyung Jo, Yeongju-si (KR)

(73) Assignees: SK Innovation Co., Ltd., Seoul (KR); SK-Materials Co., Ltd., Yeongju-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/839,122

(22) Filed: Apr. 3, 2020

(65) Prior Publication Data

US 2020/0331936 A1 Oct. 22, 2020

(30) Foreign Application Priority Data

Apr. 18, 2019 (KR) .................. 10-2019-0045307

(51) Int. Cl.
*C07F 7/18* (2006.01)
(52) U.S. Cl.
CPC .................. *C07F 7/1804* (2013.01)
(58) Field of Classification Search
CPC ................ H01L 21/31111
See application file for complete search history.

(56) References Cited

U.S. PATENT DOCUMENTS

| | | | | |
|---|---|---|---|---|
| 9,096,620 | B2* | 8/2015 | Chen | C07F 7/1804 |
| 10,781,371 | B2* | 9/2020 | Kim | C07F 7/0834 |
| 10,836,962 | B2* | 11/2020 | Kim | C07F 7/1804 |
| 2014/0296552 | A1* | 10/2014 | Chen | C07F 7/1804 |
| | | | | 556/408 |
| 2019/0359866 | A1* | 11/2019 | Bartholomew | B01J 19/123 |
| 2019/0359887 | A1* | 11/2019 | Kim | H01L 21/31111 |
| 2020/0131439 | A1* | 4/2020 | Kim | H01L 21/31111 |
| 2020/0377793 | A1* | 12/2020 | Kim | C09K 13/06 |
| 2020/0377794 | A1* | 12/2020 | Kim | H01L 21/31111 |

OTHER PUBLICATIONS

CAS Abstractor W. Chen et al., US 20140296552 (2014) (Year: 2014).*
CAS Abstract RN 884093-11-2 (2006) (Year: 2006).*
CAS Abstract of RN 923196-94-5 (2007) (Year: 2007).*
CAS Abstract M. Sorokin et al., 69 Russian Journal of General Chemistry (Translation of Zhurnal Obshchei Khimii) (1999) (Year: 1999).*
CAS Abstract CS 196940 (1980) (Year: 1980).*
CAS Abstract, M. Voronkov et al., Zeitschrift fuer Chemie (1983) (Year: 1983).*
G. Singh et al., 41 New Journal of Chemistry, 11626-11639 (2017) (Year: 2017).*
Email Communication with CAS (Sep. 18, 2020) (Year: 2020).*
Sorokin et al., 69 Russian Journal of General Chemistry (Translation of Zhurnal Obshchei Khimii) (1999) (Year: 1999).*

* cited by examiner

*Primary Examiner* — Alexander R Pagano
(74) *Attorney, Agent, or Firm* — Oblon, McClelland, Maier & Neustadt, L.L.P.

(57) ABSTRACT

The present disclosure relates to a silicon compound represented by Formula 1 below:

[Formula 1]

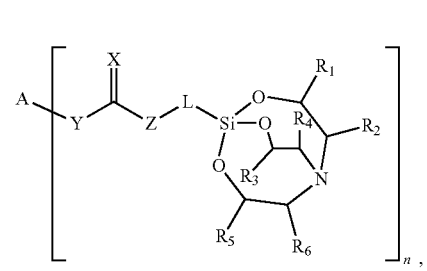

wherein $R^1$ to $R^6$ are each independently selected from a hydrogen, a hydrocarbyl group and a non-hydrocarbyl group, L is a direct bond or hydrocarbylene, X is oxygen (O) or sulfur (S), Y and Z are each independently selected from $NR^7$, O, and S, where $R^7$ is a hydrogen, a hydrocarbyl group, or a non-hydrocarbyl group, and Y and Z are not simultaneously $NR^7$, and A is an n-valent radical, where n is an integer of 1 to 6.

20 Claims, No Drawings

SILICON COMPOUND

CROSS-REFERENCE TO RELATED APPLICATION(S)

This application claims benefit of priority to Korean Patent Application No. 10-2019-0045307 filed on Apr. 18, 2019 in the Korean Intellectual Property Office, the disclosure of which is incorporated herein by reference in its entirety.

BACKGROUND

1. Field

The present disclosure relates to a novel silicon compound.

2. Description of Related Art

An oxide film, such as a silicon oxide ($SiO_2$) film, and a nitride film, such as a silicon nitride (SiNx) film, are representative insulator films, and in a semiconductor manufacturing process, such a silicon oxide film or such a silicon nitride film is used alone or in the form of a laminate in which one or more films are alternately stacked. In addition, the oxide film or the nitride film is also used as a hard mask for forming a conductive pattern such as a metal wiring.

In a wet etching process for removing a nitride film, a mixture of phosphoric acid and deionized water is generally used. The deionized water is added for preventing a decrease in an etching rate and a change in etching selectivity of the nitride film to the oxide film; however, there may be a problem in that defects may arise in a nitride film etching removal process even with a minute change in an amount of supplied deionized water. In addition, phosphoric acid is a strong acid and is corrosive, thereby having difficulties in terms of the handling thereof.

As a technology for solving these problems, a method for removing a nitride film using an etching composition including fluoric acid (HF), nitric acid ($HNO_3$), or the like, in phosphoric acid ($H_3PO_4$) is known in the art, but the method serves to inhibit an etching selection ratio of the nitride film and the oxide film. In addition, there is also a known technology of using an etching composition including phosphoric acid and a silicate or silicic acid; however, the silicic acid or silicate has a problem of causing particles which may affect a substrate, thereby being somewhat inappropriate for a semiconductor manufacturing process.

However, when phosphoric acid is used in a wet etching process for removing the nitride film, not only the nitride film but also an SOD oxide film is etched due to a reduced etching selection ratio between the nitride film and the oxide film, whereby it may be difficult to adjust an effective field oxide height (EFH). Accordingly, a sufficient wet etching time for removing the nitride film may not be secured, or an additional process is needed, which causes a change and has a negative influence on device characteristics.

Therefore, an etching composition having a high selection ratio, which selectively etches a nitride film to an oxide film and does not have a problem such as particle occurrence in a semiconductor manufacturing process, is currently demanded.

Meanwhile, a silane-based additive, an additive added to a conventional etching solution composition, has low, inadequate solubility, thereby causing precipitation of particles in the etching solution composition and abnormal growth of the substrate. Such particles may remain on the silicon substrate, resulting in defects of the device implemented thereon, or may remain on equipment used in a washing process, resulting in equipment failure.

Further, long-term storage of the etching composition changes etching rates of the nitride film or the silicon oxide film, thereby changing selectivity.

SUMMARY

An aspect of the present disclosure may provide a novel silicon compound, more specifically, a silicon compound appropriate for being used as a silane additive in an etching composition.

According to an aspect of the present disclosure, a silicon compound represented by following Formula 1 is provided:

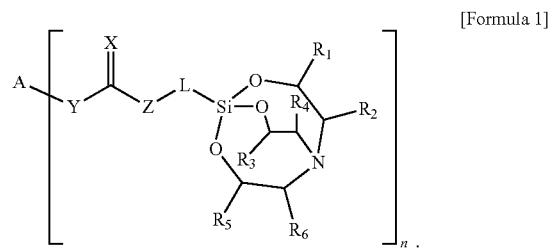

[Formula 1]

In Formula 1, $R^1$ to $R^6$ are each independently selected from a hydrogen, a hydrocarbyl group, and a non-hydrocarbyl group, and L is a direct bond or hydrocarbylene, X is oxygen (O) or sulfur (S). Y and Z are each independently selected from $NR^7$, O, and S, where $R^7$ is a hydrogen, a hydrocarbyl group or a non-hydrocarbyl group, and Y and Z are not simultaneously $NR^7$. A is an n-valent radical, where n is an integer of 1 to 6.

In an exemplary embodiment, a silicon compound, in which $R^1$ to $R^6$ are all hydrogen, is provided.

In an exemplary embodiment, a silicon compound, in which L is a $C_1$-$C_{10}$ alkylene, is provided In an exemplary embodiment, a silicon compound, in which A is *—$(CH_2)_pR^{11}$, is provided, where p is an integer of 1 to 3, $R^{11}$ is hydrogen, halogen, a substituted or unsubstituted $C_1$-$C_{20}$ alkyl group, a substituted or unsubstituted $C_6$-$C_{20}$ aryl group, or a substituted or unsubstituted ($C_1$-$C_{20}$) alkyl($C_1$-$C_{20}$) alkoxy group.

In an exemplary embodiment, a silicon compound, in which n is 1, and A is *—$CH_3$, *—$(CH_2)_2OCH_3$ or *—$CH_3C_6H_5$, is provided.

In an exemplary embodiment, a silicon compound, in which n is an integer of 2 to 6, and A is

where q is an integer of 0 to 4, is provided.

In an exemplary embodiment, a silicon compound, in which n is an integer of 6, and A is

is provided.

In an exemplary embodiment, a silicon compound represented by one of Structural Formulae 1 to 5 is provided:

DETAILED DESCRIPTION

The present disclosure is to provide a silicon compound added to an etching composition.

As used herein, the term "hydrocarbyl" refers to any univalent substituent derived from a hydrocarbon.

As used herein, the term "non-hydrocarbyl" refers to a substituent which is not a hydrocarbyl group.

The silicon compound of the present disclosure may be, for example, a silicon compound represented by following Formula 1:

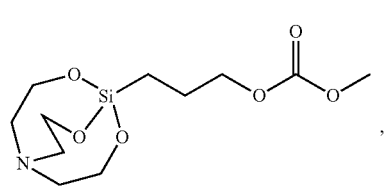

(1)

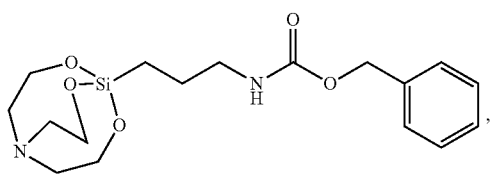

(2)

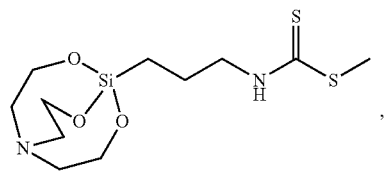

(3)

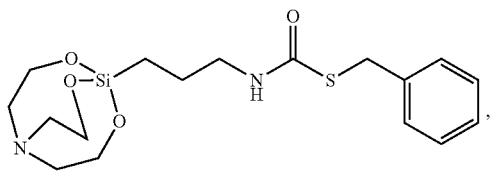

(4)

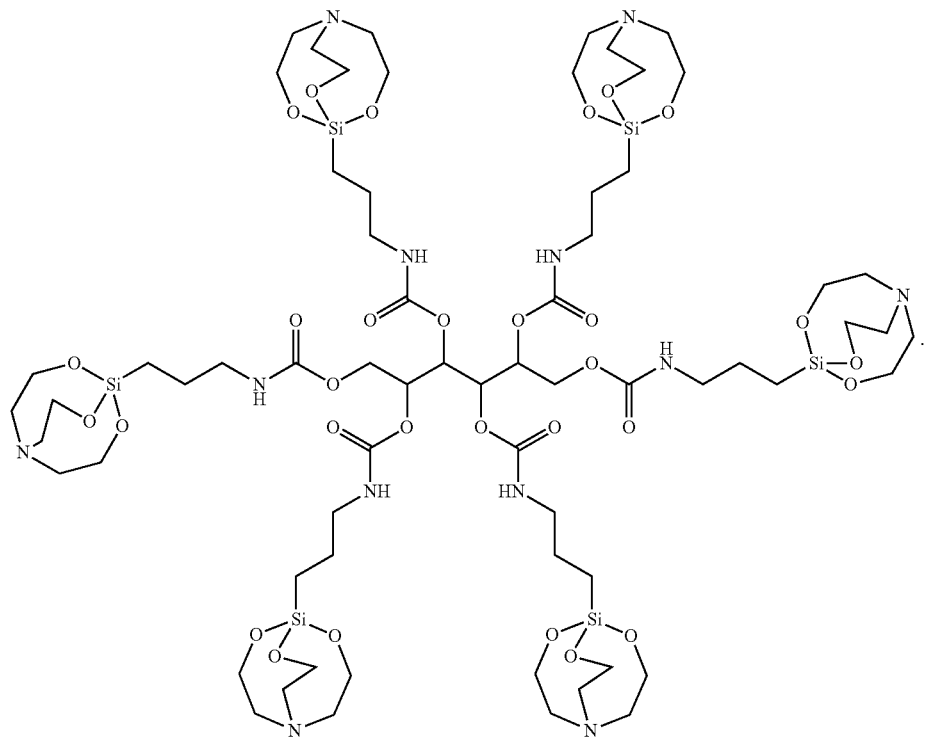

(5)

[Formula 1]

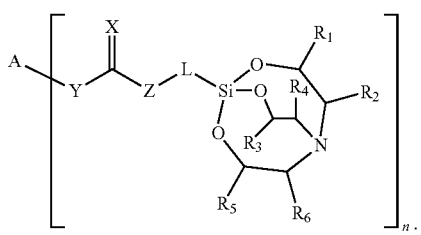

In Formula 1, $R^1$ to $R^6$ may be each independently selected from a hydrogen, a hydrocarbyl group, and a non-hydrocarbyl group. For example, the hydrocarbyl or non-hydrocarbyl group may be a substituted or unsubstituted $C_1$-$C_{20}$ hydrocarbyl group, a $C_1$-$C_{20}$ alkoxy group, a carboxy group, a carbonyl group, a nitro group, a tri($C_1$-$C_{20}$)alkylsilyl group, a phosphoryl group, or a cyano group, but is not limited thereto. For example, $R^1$ to $R^6$ may all be hydrogen.

The substituted or unsubstituted $C_1$-$C_{20}$ hydrocarbyl group may be a substituted or unsubstituted $C_1$-$C_{20}$ alkyl group or a substituted or unsubstituted $C_6$-$C_{20}$ aryl group. The substituted hydrocarbyl group may be a hydrocarbyl group substituted with a halogen such as an alkyl halide.

The L may be a direct bond or hydrocarbylene. For example, the L may be $C_1$-$C_{10}$ hydrocarbylene or $C_1$-$C_5$ hydrocarbylene. For example, L may be $C_1$-$C_5$ alkylene, specifically $C_1$-$C_3$ alkylene.

In Formula 1 above, X is O or S. Further in Formula 1, Y and Z may be are each independently selected from $NR^7$, O and S, where $R^7$ may be a hydrogen, a hydrocarbyl group, or a non-hydrocarbyl group. Y and Z are not simultaneously $NR^7$. The hydrocarbyl group or non-hydrocarbyl group may be a substituted or unsubstituted $C_1$-$C_{20}$ hydrocarbyl group, a $C_1$-$C_{20}$ alkoxy group, a carboxy group, a carbonyl group, a nitro group, a tri($C_1$-$C_{20}$)alkylsilyl group, a phosphoryl group, or a cyano group, but is not limited thereto.

When X, Y and Z are as above, the silicon compound may be polarized to increase solubility in a polar solvent such as water, aqueous phosphoric acid, aqueous hydrochloric acid, sulfuric acid, and the like. As such, an effect of suppressed formation of insoluble particles can be obtained when used as an additive of an etching composition, and thus, it is preferable.

The A represents an n-valent radical, where n is an integer of 1 to 6.

For example, A may be a univalent radical, represented by *—$(CH_2)_pR^{11}$, where p is an integer of 1 to 3, and $R^{11}$ is hydrogen, halogen, a substituted or unsubstituted $C_1$-$C_{20}$ alkyl group, a substituted or unsubstituted $C_1$-$C_{20}$ aryl group, or a substituted or unsubstituted $(C_1$-$C_{20})$alkyl($C_1$-$C_{20}$) alkoxy group. For example, A may be a univalent radical, such as *—$CH_3$, *—$(CH_2)_2OCH_3$ or *—$CH_3C_6H_5$.

Further, the A may be an n-valent radical, where n is an integer of 2 to 6. For example, the A is represented by

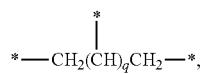

and may be a 2- to 6-valent radical where q is an integer of 1 to 4. In the case of a 2-valent radical, A may be *—$CH_2CH_2$—* (q=0), and in the case of a 3-valent radical, A may be

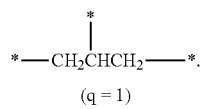

In the case of a 4-valent radical, A may be

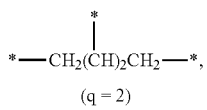

and in the case of a 5-valent radical, A may be

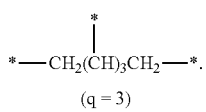

In the case of a 6-valent radical, A may be

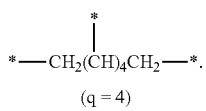

Although not limited, the silicon compound represented by Formula 1 above, may be any one of the silicon compound represented by following Structural Formulae 1 to 5:

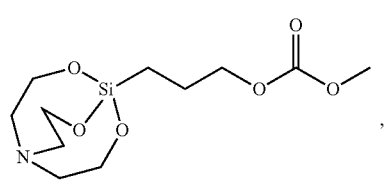

(1)

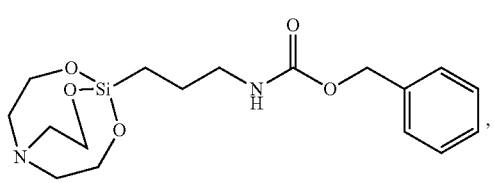

(2)

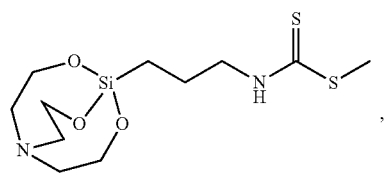

(3)

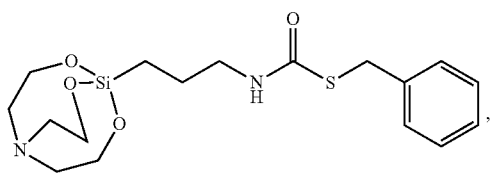

(4)

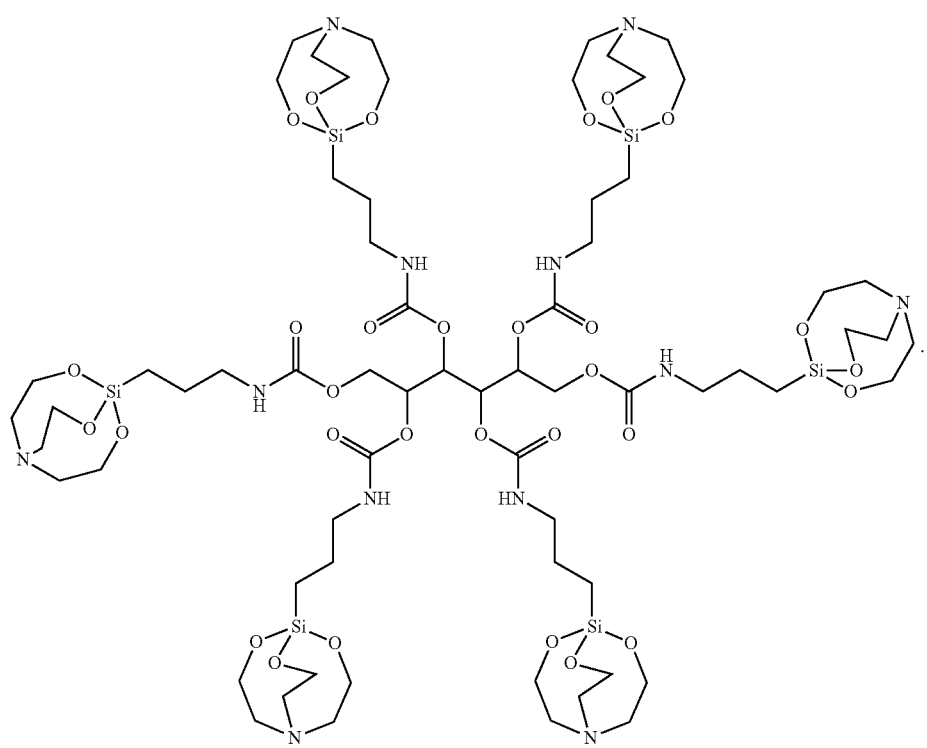

(5)

The silicon compound as the above may be used as an additive of an etching composition used in a wet etching process for selectively removing a silicon nitride film during a semiconductor manufacturing process. Oxygen atoms contained in the silicon compound can bind to a surface of the oxide film to protect the oxide film and may be hydrogen-bonded to the surface of the oxide film, thereby minimizing etching of the oxide film during etching of the nitrides in the etching composition.

In addition, the silicon compound is a cyclic silicon compound and may be present in the etching composition in a most stable form, and thus may have a significantly increased etching selection ratio as compared with a short chain silicon additive which has conventionally been used. Furthermore, structural stability of an active silicon-based additive in the etching composition is improved by including such cyclic compound, thereby continuously maintaining the etching speed of the silicon oxide film.

The silicon compound suggested in the present disclosure can effectively protect the silicon oxide film even when added in a small amount, thereby increasing etching selectivity of the nitride film to the oxide film.

Meanwhile, a silane compound conventionally used as an additive for the etching composition has low solubility. When a silane-based additive whose proper solubility is not ensured in the etching composition is used or if a compositional ratio is not adjusted to an appropriate level, silicon-based particles may be precipitated, and abnormal growth may be caused in the etching composition. Such particles may remain in a silicon substrate to cause defects in devices implemented on the substrate or may remain in equipment (e.g., a filter) used in the etching or washing to cause equipment failure.

The etching composition provided in the present disclosure, however, can prevent particle production and have improved storage stability by preventing silica formation while improving selectivity of the nitride film to the oxide film by preventing etching of oxides by the silicon compound as the above.

EXAMPLE

Hereinafter, the present disclosure will be described in detail by way of Examples. The following Examples relate to an example of the present disclosure, but the present disclosure is not limited thereto.

Synthesis Example 1

7.0 g of methyl(3-triethoxysilyl)propyl carbonate, 3.7 g of triethanolamine, 35 mL of tetrahydrofuran and 0.2 g of sodium hydroxide were added to a 100 mL round bottom flask, heated to 50° C. and stirred for 4 hours.

Tetrahydrofuran was then removed under reduced pressure to obtain a white solid.

The white solid was re-slurried with ethyl acetate to synthesize 5.1 g of purified Silicon Compound 1, 3-(2,8,9-trioxa-5-aza-1-silabicyclo[3.3.3]undecan-1-yl)propylmethyl carbonate:

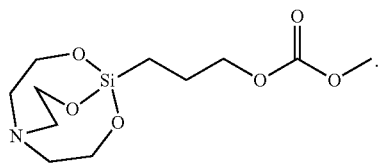 [SMILES: COC(=O)OCCC[Si]12OCCN(CCO1)CCO2]

$^1$H-NMR (CDCl$_3$) 4.21 (t, 2H), 3.89 (t, 6H), 3.79 (s, 3H), 2.55 (t, 6H), 1.60 (m, 2H), 0.58 (t, 2H)

Synthesis Example 2

7.8 g of benzyl(3-(triethoxysilyl)propyl)carbamate, 3.7 g of triethanolamine, 35 mL of tetrahydrofuran and 0.2 g of sodium hydroxide were added to a 100 mL round bottom flask, heated to 50° C. and stirred for 4 hours.

Tetrahydrofuran was then removed under reduced pressure to obtain a white solid.

The white solid was re-slurried with ethyl acetate to synthesize 4.8 g of purified Silicon Compound 2, benzyl(3-(2,8,9-trioxa-5-aza-1-silabicyclo[3.3.3]undecan-1-yl)propyl)carbamate:

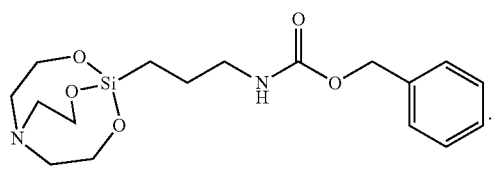 [SMILES: O=C(NCCC[Si]12OCCN(CCO1)CCO2)OCc1ccccc1]

$^1$H-NMR (CDCl$_3$) 7.36 (m, 4H), 5.08 (s, 2H), 3.89 (t, 6H), 3.22 (t, 2H), 2.55 (t, 6H), 1.60 (m, 2H), 0.58 (t, 2H)

Synthesis Example 3

7.7 g of methyl(3-(triethoxysilyl)propyl)carbamodithioate, 3.7 g of triethanolamine, 35 mL of tetrahydrofuran and 0.2 g of sodium hydroxide were added to a 100 mL round bottom flask, heated to 50° C. and stirred for 4 hours.

Tetrahydrofuran was then removed under reduced pressure to obtain a yellow solid.

The yellow solid was re-slurried with ethyl acetate to synthesize 5.8 g of purified Silicon Compound 3, methyl-(3-(2,8,9-trioxa-5-aza-1-silabicyclo[3.3.3]undecan-1-yl)propyl)carbamodithioate:

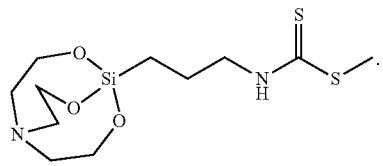 [SMILES: CSC(=S)NCCC[Si]12OCCN(CCO1)CCO2]

$^1$H-NMR (CDCl$_3$) 3.89 (t, 6H), 2.87 (t, 2H), 2.55 (m, 9H), 1.60 (m, 2H), 0.58 (t, 2H)

Synthesis Example 4

3.0 g of S-(2-methoxyethyl) (3-(trimethoxysilyl)propyl) carbamothioate, 1.5 g of triethanolamine, 30 mL of tetrahydrofuran and 0.2 g of sodium hydroxide were added to a 100 mL round bottom flask, heated to 50° C. and stirred for 4 hours.

Tetrahydrofuran was then removed under reduced pressure to obtain a yellow solid.

The yellow solid was re-slurried with ethyl acetate to synthesize 1.0 g of purified Silicon Compound 4, S-(2-methoxyethyl) (3-(2,8,9-trioxa-5-aza-1-silabicyclo[3.3.3]undecan-1-yl)propyl)carbamothioate:

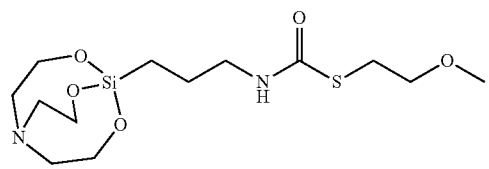

$^1$H-NMR(CDCl$_3$) 3.89 (m, 6H), 3.58 (t, 2H), 3.50 (t, 2H), 3.21 (s, 3H), 3.13 (t, 2H), 2.60 (t, 6H), 1.60 (m, 2H), 0.58 (t, 2H)

Synthesis Example 5

14.1 g of hexane-1,2,3,4,5,6-hexyl hexakis ((3-(triethoxysilyl)propyl)carbamate), 9.0 g of triethanolamine, 50 mL of tetrahydrofuran and 0.2 g of sodium hydroxide were added to a 100 mL round bottom flask, heated to 50° C. and stirred for 4 hours.

Tetrahydrofuran was then removed under reduced pressure to obtain a yellow solid.

The yellow solid was re-slurried with ethyl acetate to synthesize 6.1 g of a purified Silicon Compound 5, [hexane-1,2,3,4,5,6-hexyl hexakis ((3 (2,8,9-trioxa-5-aza-1-silabicyclo[3.3.3]undecan-1-yl)propyl) carbamate):

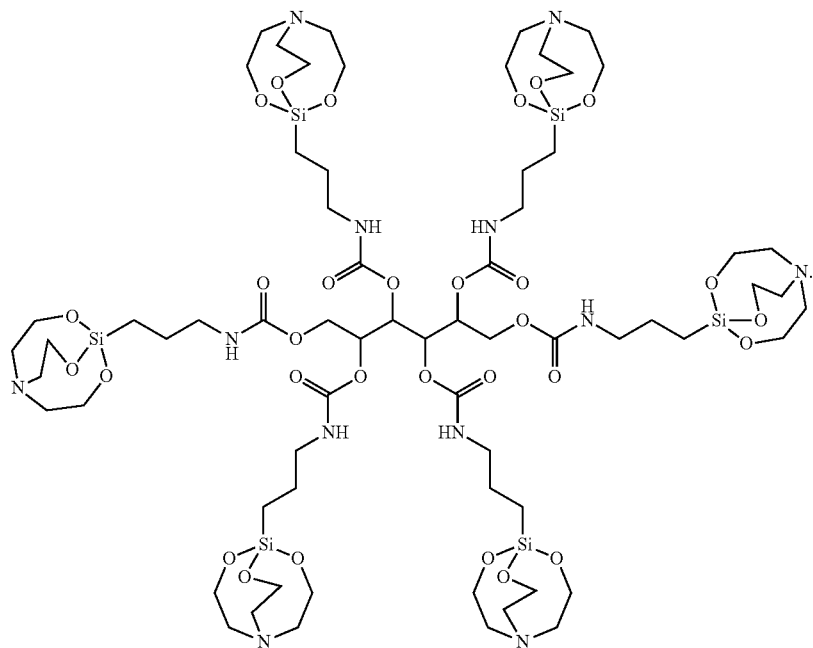 [SMILES: O=C(NCCC[Si]12OCCN(CCO1)CCO2)OCC(OC(=O)NCCC[Si]12OCCN(CCO1)CCO2)C(OC(=O)NCCC[Si]12OCCN(CCO1)CCO2)C(OC(=O)NCCC[Si]12OCCN(CCO1)CCO2)C(COC(=O)NCCC[Si]12OCCN(CCO1)CCO2)OC(=O)NCCC[Si]12OCCN(CCO1)CCO2]

¹H-NMR (CDCl₃) 5.01 (m, 4H), 4.43 (m, 4H), 3.85 (m, 36H), 2.88 (t, 12H), 2.55 (m, 36H), 1.60 (m, 12H), 0.58 (t, 12H)

The silicon compound according to an exemplary embodiment of the present disclosure is appropriately used as an additive of an etching composition, and the etching composition containing the silicon compound as an additive has a high etching selection ratio of a nitride film to an oxide film.

While exemplary embodiments have been shown and described above, it will be apparent to those skilled in the art that modifications and variations could be made without departing from the scope of the present invention as defined by the appended claims.

What is claimed is:

1. A silicon compound represented by Formula 1 below:

[Formula 1]

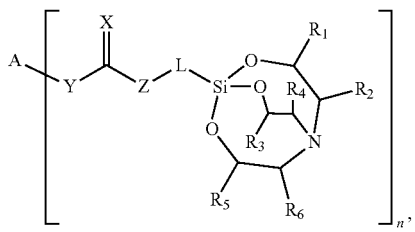

wherein:
$R^1$ to $R^6$ are each independently selected from a hydrogen, a hydrocarbyl group, and a non-hydrocarbyl group,
L is a direct bond or a $C_2$-$C_{10}$ hydrocarbylene,
X is oxygen (O) or sulfur (S),
Y is $NR^7$, O, or S,
Z is $NR^7$ or O,
where $R^7$ is a hydrogen, a hydrocarbyl group, or a non-hydrocarbyl group, and Y and Z are not simultaneously $NR^7$, and
A is an n-valent radical, where n is an integer of 1 to 6.

2. The silicon compound of claim 1, wherein $R^1$ to $R^6$ are all hydrogen.

3. The silicon compound of claim 1, wherein L is $C_2$-$C_{10}$ alkylene.

4. The silicon compound of claim 1, wherein A is *—$(CH_2)_pR^{11}$,
where p is an integer of 1 to 3, $R^{11}$ is hydrogen, halogen, a substituted or unsubstituted $C_1$-$C_{20}$ alkyl group, a substituted or unsubstituted $C_6$-$C_{20}$ aryl group, or a substituted or unsubstituted $(C_1$-$C_{20})$alkyl$(C_1$-$C_{20})$ alkoxy group.

5. The silicon compound of claim 4, wherein n is 1, and A is *—$CH_3$, *—$(CH_2)_2OCH_3$, or *—$CH_3C_6H_5$.

6. The silicon compound of claim 1, wherein n is an integer of 2 to 6, and A is

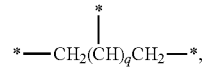

where q is an integer of 0 to 4.

7. The silicon compound of claim 6, wherein n is an integer of 6, and A
8. The silicon compound of claim 1, wherein the silicon compound is represented by one of the following structural formulae:
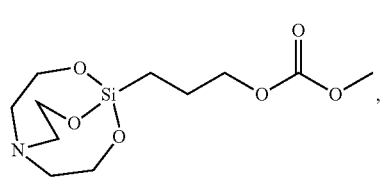 (1)
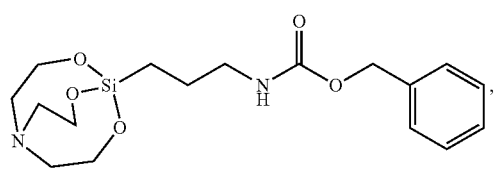 (2)
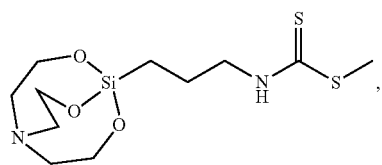 (3)
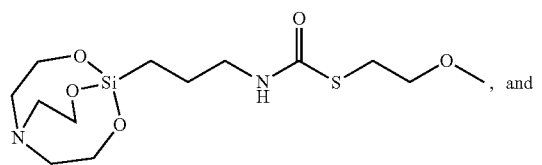 (4) , and
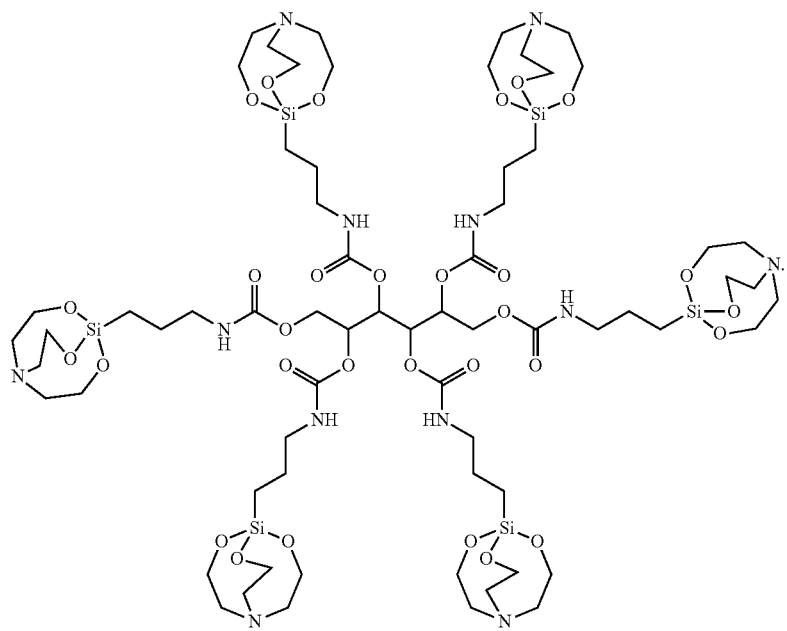 (5)

9. A silicon compound represented by Formula 1 below:

[Formula 1]

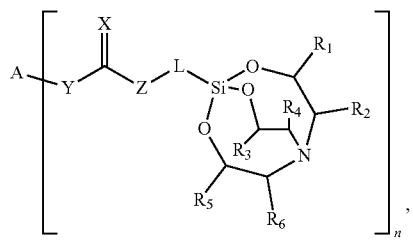

wherein:
R¹ to R⁶ are each independently selected from a hydrogen, a hydrocarbyl group, and a non-hydrocarbyl group,
L is a direct bond or hydrocarbylene,
X is oxygen (O) or sulfur (S),
Y is NR⁷, O, or S,
Z is NR⁷ or O,
where R⁷ is a hydrogen, a hydrocarbyl group, or a non-hydrocarbyl group,
Y and Z are not simultaneously NR⁷,
n is 1 and A is *—CH₃, *—(CH₂)₂OCH₃ or *—CH₃C₆H₅.

10. The silicon compound of claim 9, wherein R¹ to R⁶ are all hydrogen.

11. The silicon compound of claim 1, wherein L is a $C_1$-$C_{10}$ alkylene.

12. The silicon compound of claim 9, wherein A is *—(CH₂)$_p$R¹¹,
where p is an integer of 1 to 3, R¹¹ is hydrogen, halogen, a substituted or unsubstituted $C_1$-$C_{20}$ alkyl group, a substituted or unsubstituted $C_6$-$C_{20}$ aryl group, or a substituted or unsubstituted ($C_1$-$C_{20}$)alkyl($C_1$-$C_{20}$)alkoxy group.

13. The silicon compound of claim 9, wherein the silicon compound is represented by one of the following structural formulae:

(1)
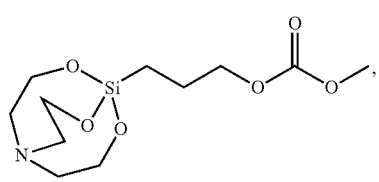

(2)
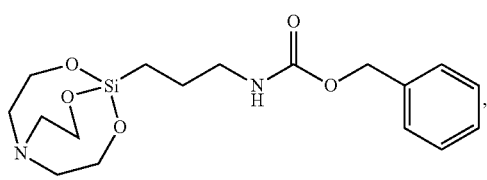

(3)
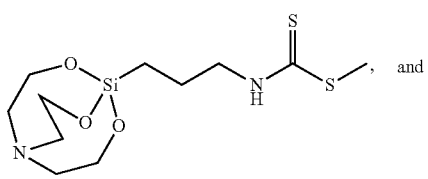
and (4)
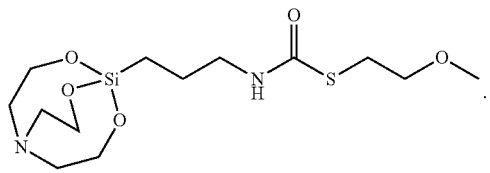

14. A silicon compound represented by Formula 1 below:

[Formula 1]

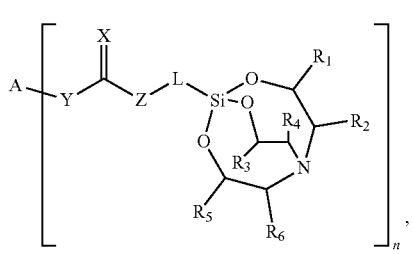

wherein:
R¹ to R⁶ are each independently selected from a hydrogen, a hydrocarbyl group, and a non-hydrocarbyl group,
L is a direct bond or hydrocarbylene,
X is oxygen (O) or sulfur (S),
Y is NR⁷, O, or S,
Z is NR⁷ or O,
where R⁷ is a hydrogen, a hydrocarbyl group, or a non-hydrocarbyl group, and
Y and Z are not simultaneously NR⁷, and
A is an n-valent radical, where n is an integer of 2 to 6.

15. The silicon compound of claim 14, wherein R¹ to R⁶ are all hydrogen.

16. The silicon compound of claim 14, wherein L is a $C_1$-$C_{10}$ alkylene.

17. The silicon compound of claim 14, wherein A is *—(CH₂)$_p$R¹¹,
where p is an integer of 1 to 3, R¹¹ is hydrogen, halogen, a substituted or unsubstituted $C_1$-$C_{20}$ alkyl group, a substituted or unsubstituted $C_6$-$C_{20}$ aryl group, or a substituted or unsubstituted ($C_1$-$C_{20}$)alkyl($C_1$-$C_{20}$)alkoxy group.

18. The silicon compound of claim 14, wherein n is an integer of 2 to 6, and A is

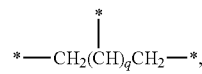

where q is an integer of 0 to 4.

19. The silicon compound of claim 18, wherein n is an integer of 6, and A is

20. The silicon compound of claim 14, wherein the silicon compound is represented by the following structural formula:

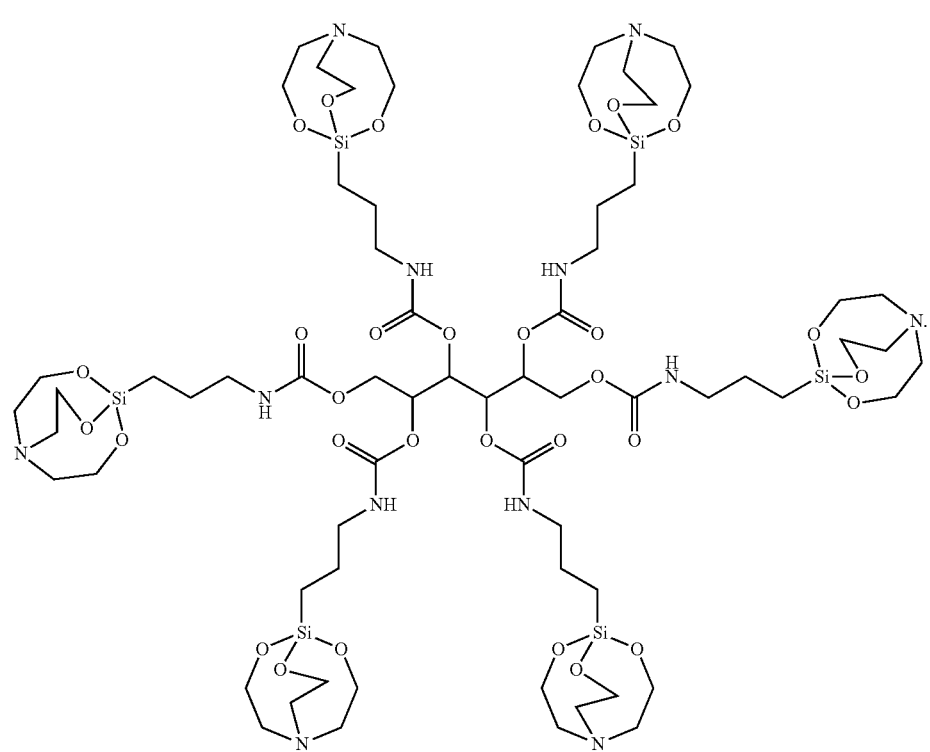
(5)
* * * * *